(12) United States Patent
Nago et al.

(10) Patent No.: US 9,096,288 B2
(45) Date of Patent: Aug. 4, 2015

(54) DUAL HYDRAULIC CONTROLLER FOR BICYCLE COMPONENTS

(75) Inventors: Daisuke Nago, Sakai (JP); Shinya Hirotomi, Sakai (JP); Masahiro Nakakura, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 785 days.

(21) Appl. No.: 13/344,055

(22) Filed: Jan. 5, 2012

(65) Prior Publication Data

US 2013/0174543 A1 Jul. 11, 2013

(51) Int. Cl.
| | |
|---|---|
| F15B 15/20 | (2006.01) |
| B62L 3/02 | (2006.01) |
| B60T 11/20 | (2006.01) |
| B62K 23/06 | (2006.01) |
| B62M 25/08 | (2006.01) |
| B60T 11/22 | (2006.01) |

(52) U.S. Cl.
CPC .............. B62L 3/023 (2013.01); B60T 11/20 (2013.01); B60T 11/203 (2013.01); B60T 11/206 (2013.01); B62K 23/06 (2013.01); B62M 25/08 (2013.01); B60T 11/22 (2013.01)

(58) Field of Classification Search
CPC ....... B60T 7/102; B60T 11/20; B60T 11/203; B60T 11/206; B60T 11/22; B62L 3/023; B62L 3/08; B62M 25/08; B62K 23/06
USPC .................... 60/581, 583, 585, 588
See application file for complete search history.

(56) References Cited

U.S. PATENT DOCUMENTS

| 3,348,377 | A | * | 10/1967 | Freeman et al. ................. 60/581 |
| 3,370,426 | A | * | 2/1968 | Fay ................................. 60/581 |
| 3,742,777 | A | * | 7/1973 | Mathauser ....................... 474/81 |
| 3,885,391 | A | * | 5/1975 | Campbell et al. ............... 60/581 |
| 6,003,639 | A | | 12/1999 | Buckley et al. |
| 6,066,057 | A | | 5/2000 | Nakamura et al. |
| 7,032,475 | B2 | * | 4/2006 | Ichida et al. ................. 74/502.2 |
| 7,377,367 | B2 | | 5/2008 | Takizawa et al. |

(Continued)

FOREIGN PATENT DOCUMENTS

| CN | 102303680 A | 1/2012 |
| JP | 09-164986 A | 6/1997 |

(Continued)

OTHER PUBLICATIONS

U.S. Appl. No. 13/175,687; "Hydraulic Rim Brake for a Bicycle;" (Nago); filed Jul. 1, 2011; unpublished as of Jan. 5, 2012. Taiwanese Search Report for TW 101128514, the Taiwanese application that claims priority from this application.

*Primary Examiner* — Dwayne J White
*Assistant Examiner* — Logan Kraft
(74) *Attorney, Agent, or Firm* — James A. Deland

(57) ABSTRACT

A dual hydraulic controller apparatus comprises a housing, a first master cylinder disposed at the housing, and a second master cylinder disposed at the housing and coupled to the first master cylinder. The first master cylinder includes a first hydraulic chamber and a first piston disposed in the first hydraulic chamber for reciprocal movement therein. The second master cylinder includes a second hydraulic chamber and a second piston disposed in the second hydraulic chamber for reciprocal movement therein. A first operating member is coupled to the first piston for reciprocating the first piston, and a second operating member is coupled to the second piston for reciprocating the second piston.

12 Claims, 10 Drawing Sheets

(56) References Cited

U.S. PATENT DOCUMENTS

| | | |
|---|---|---|
| 7,461,724 B2 | 12/2008 | Nago |
| 7,530,435 B2 * | 5/2009 | Lumpkin .................. 188/344 |
| 7,757,488 B2 * | 7/2010 | Dunlap, III ................ 60/594 |
| 7,938,234 B2 * | 5/2011 | Jinbo et al. ............. 188/24.22 |
| 8,375,825 B2 | 2/2013 | Hirose et al. |
| 2006/0266595 A1 | 11/2006 | Nago |

FOREIGN PATENT DOCUMENTS

| | | |
|---|---|---|
| TW | M286176 U | 1/2006 |
| TW | M369302 U | 11/2009 |
| TW | M412921 U | 10/2011 |

* cited by examiner

DUAL HYDRAULIC CONTROLLER FOR BICYCLE COMPONENTS

BACKGROUND OF THE INVENTION

The present invention is directed to bicycle components and, more particularly, to a dual hydraulic controller for bicycle components.

Modern bicycles have many components that are hydraulically operated. For example, hydraulically-operated brakes are used to decelerate and/or stop the bicycle, and hydraulically-operated suspension devices are used to dampen shocks when the bicycle is ridden over rough terrain. Each hydraulically-operated component is controlled by a separately mounted, dedicated master cylinder that is operated by a corresponding hand lever.

SUMMARY OF THE INVENTION

The present invention is directed to various features of a dual hydraulic controller for bicycle components. In one embodiment, a dual hydraulic controller apparatus comprises a housing, a first master cylinder disposed at the housing, and a second master cylinder disposed at the housing and coupled to the first master cylinder. The first master cylinder includes a first hydraulic chamber and a first piston disposed in the first hydraulic chamber for reciprocal movement therein. The second master cylinder includes a second hydraulic chamber and a second piston disposed in the second hydraulic chamber for reciprocal movement therein. A first operating member is coupled to the first piston for reciprocating the first piston, and a second operating member is coupled to the second piston for reciprocating the second piston. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
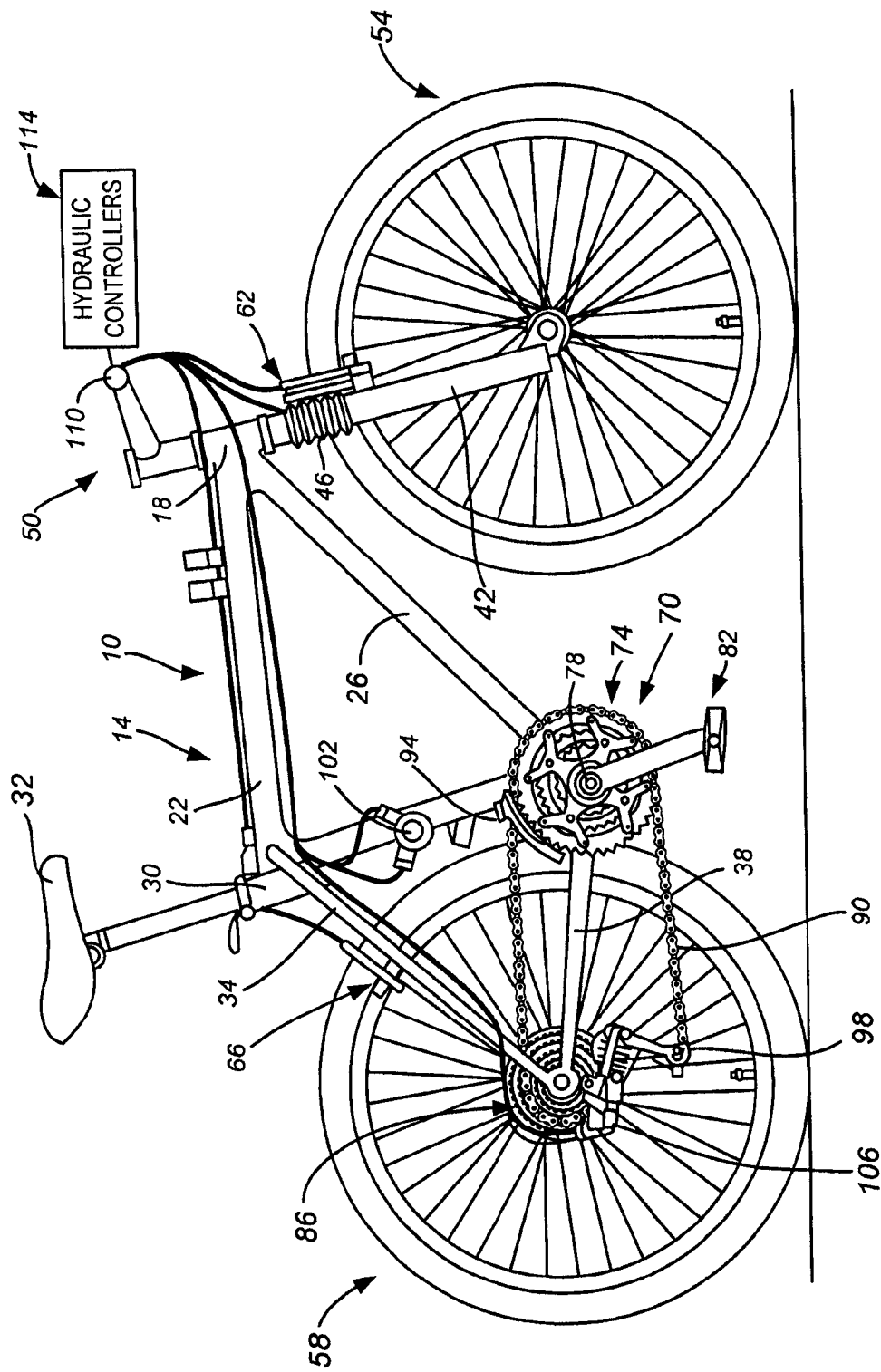
FIG. 1 is a side view of a particular embodiment of a bicycle that includes hydraulically-operated components.

FIG. 1 is a side view of a particular embodiment of a bicycle 10 that includes hydraulically-operated components. Bicycle 10 comprises a diamond-shaped frame 14 including a head tube 18, a top tube 22, a down tube 26, a staggered seat tube 30 that supports a saddle 32, a pair of seat stays 34, a pair of chainstays 38, and a bottom bracket shell (not shown) that connects down tube 26, seat tube 30 and chainstays 38 together. A front fork 42 is rotatably mounted in head tube 18 and is equipped with a pair of hydraulically-operated shock absorbers 46. A handlebar assembly 50 including a handlebar 52 (FIG. 2) is mounted to the upper portion of front fork 42, a front wheel 54 is rotatably mounted to the lower portion of front fork 42, and a rear wheel 58 is rotatably mounted to the rear of frame 14. A hydraulically-operated front brake 62 is mounted to front fork 42 for stopping front wheel 54, and a hydraulically-operated rear brake 66 is mounted to seat stays 34 for stopping rear wheel 58. Front brake 62 and rear brake 66 may be constructed according to the teachings of U.S. patent application Ser. No. 13/175,687 entitled "Hydraulic Rim Brake for a Bicycle." Alternatively, front brake 62 and rear brake 66 may be replaced with the more well-known hydraulic disk brake assemblies.

A drive unit 70 is mounted to the lower portion of frame 14. Drive unit 70 comprises a plurality of (e.g., three) front sprockets 74 rotatably mounted to the bottom bracket shell through an axle 78, a pedal assembly 82 mounted for rotation with front sprockets 74, a plurality of (e.g., eight) rear sprockets 86 mounted for rotation with rear wheel 58, a chain 90 that engages selected combinations of the plurality of front sprockets 74 and rear sprockets 86, a front derailleur 94 for switching chain 90 among the plurality of front sprockets 74, and a rear derailleur 98 for switching chain 90 among the plurality of rear sprockets 86. Front derailleur 94 is actuated by a hydraulically-operated front derailleur actuation mechanism 102 mounted to seat tube 30, and rear derailleur 98 is actuated by a hydraulically-operated rear derailleur actuation mechanism 106 that is integrally formed with rear derailleur 98.

Figure 2:
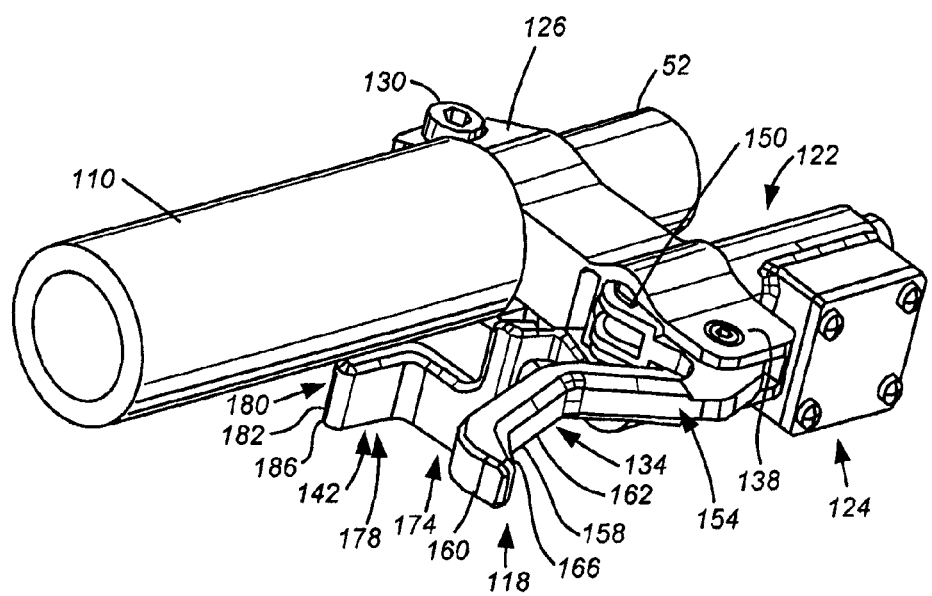
FIG. 2 is a perspective front view of a particular embodiment of a dual hydraulic controller for bicycle components.
Figure 3:
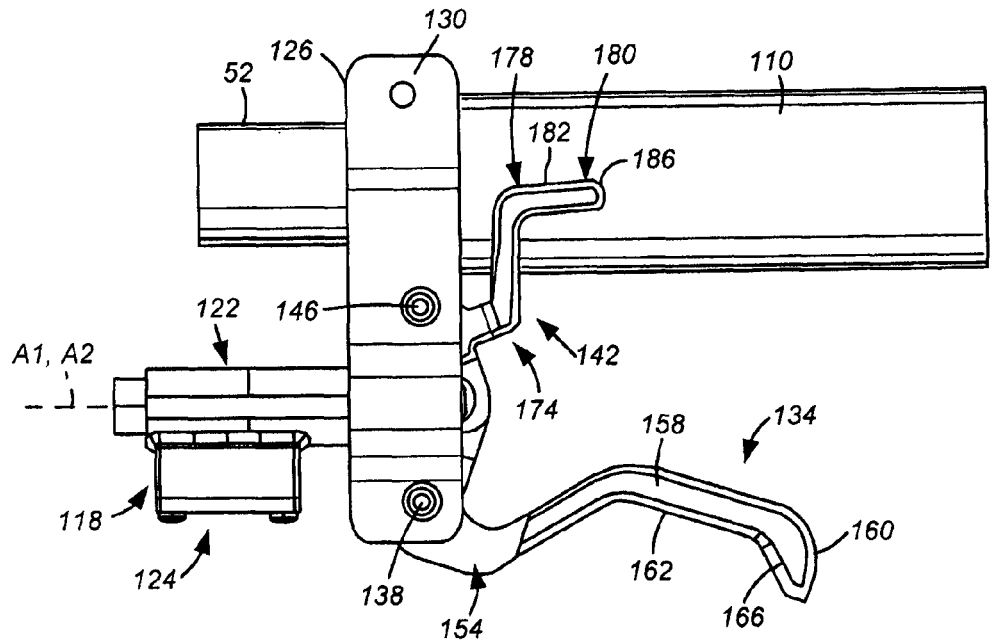
FIG. 3 is a bottom view of the controller.
Figure 4:
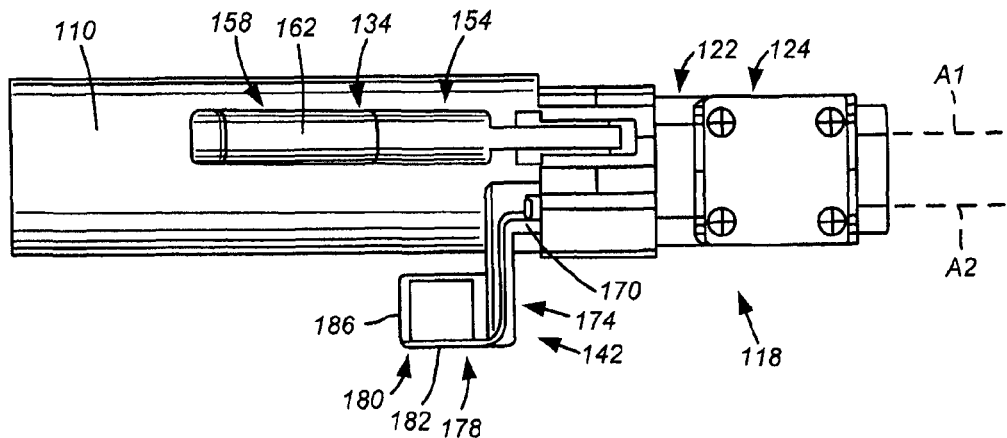
FIG. 4 is a front view of the controller.
Figure 5:
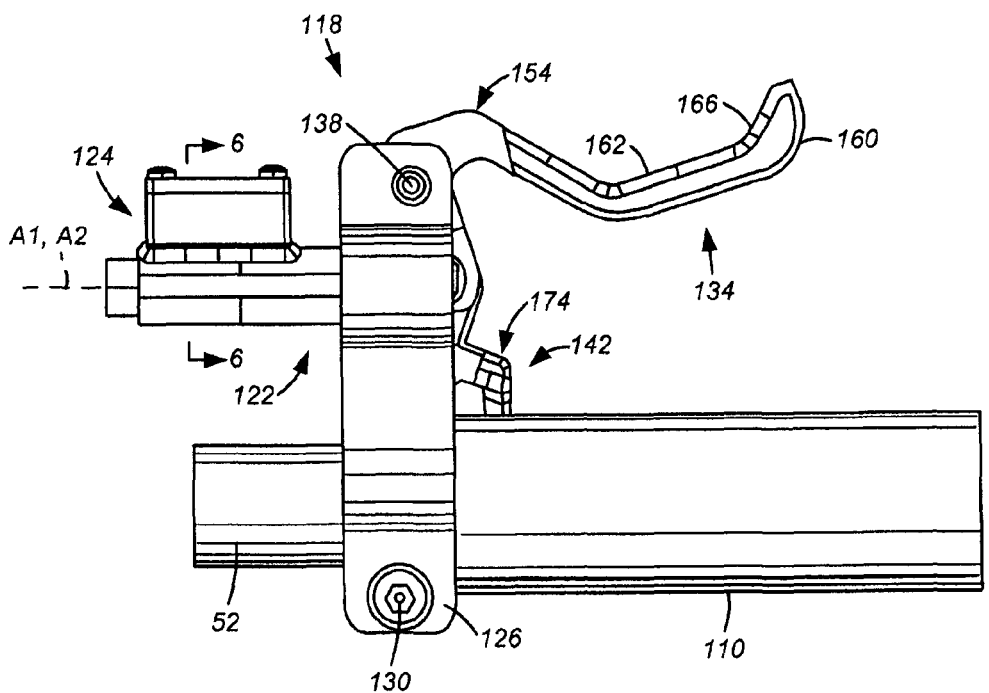
FIG. 5 is a top view of the controller.

Grips 110 are mounted to opposite lateral sides of handlebar 52, and a plurality of hydraulic controllers 114 are mounted to handlebar assembly 50 for controlling shock absorbers 46, front brake 62, rear brake 66, front derailleur actuation mechanism 102 and rear derailleur actuation mechanism 106. For example, FIG. 2 is a perspective front view of a particular embodiment of a dual hydraulic controller 118 that may be used for controlling front derailleur actuation mechanism 102 and rear derailleur actuation mechanism 106. FIG. 3 is a bottom view of controller 118, FIG. 4 is a front view of controller 118, and FIG. 5 is a top view of dual hydraulic controller 118.

In this embodiment, controller 118 comprises a housing 122 including a hydraulic fluid reservoir unit 124, wherein housing 122 is attached to handlebar 52 through a clamp 126 and a bolt 130. A first lever 134 is pivotably coupled to housing 122 through a pivot shaft 138, and a second lever 142 is pivotably coupled to housing 122 through a pivot shaft 146 (FIG. 3). First lever 134 includes a piston coupling fork 150 (FIG. 2) and a lever portion 154, wherein lever portion 154 includes an operating portion 158 and a movement resisting portion 160. Operating portion 158 includes a contact surface 162 adapted to be contacted by a user's hand (e.g., fingers) to operate first lever 134. Movement resisting portion 160 extends from operating portion 158 and includes a movement restricting surface 166 that is inclined relative to contact surface 162 for resisting movement of the user's hand away from housing 122 in a direction of a first axis A1. Second lever 142 includes a piston coupling fork 170 (FIG. 4) and a lever portion 174, wherein lever portion 174 includes an operating portion 178 and a free end portion 180. Operating portion 178 includes a contact surface 182 adapted to be contacted by a user's hand (e.g., a finger) to operate second lever 142. Free end portion 180 extends from operating portion 178 and includes a free end surface 186 that allows the user's hand to move freely away from housing 122 and off of contact surface 182 in a direction of a second axis A2.

Figure 6:
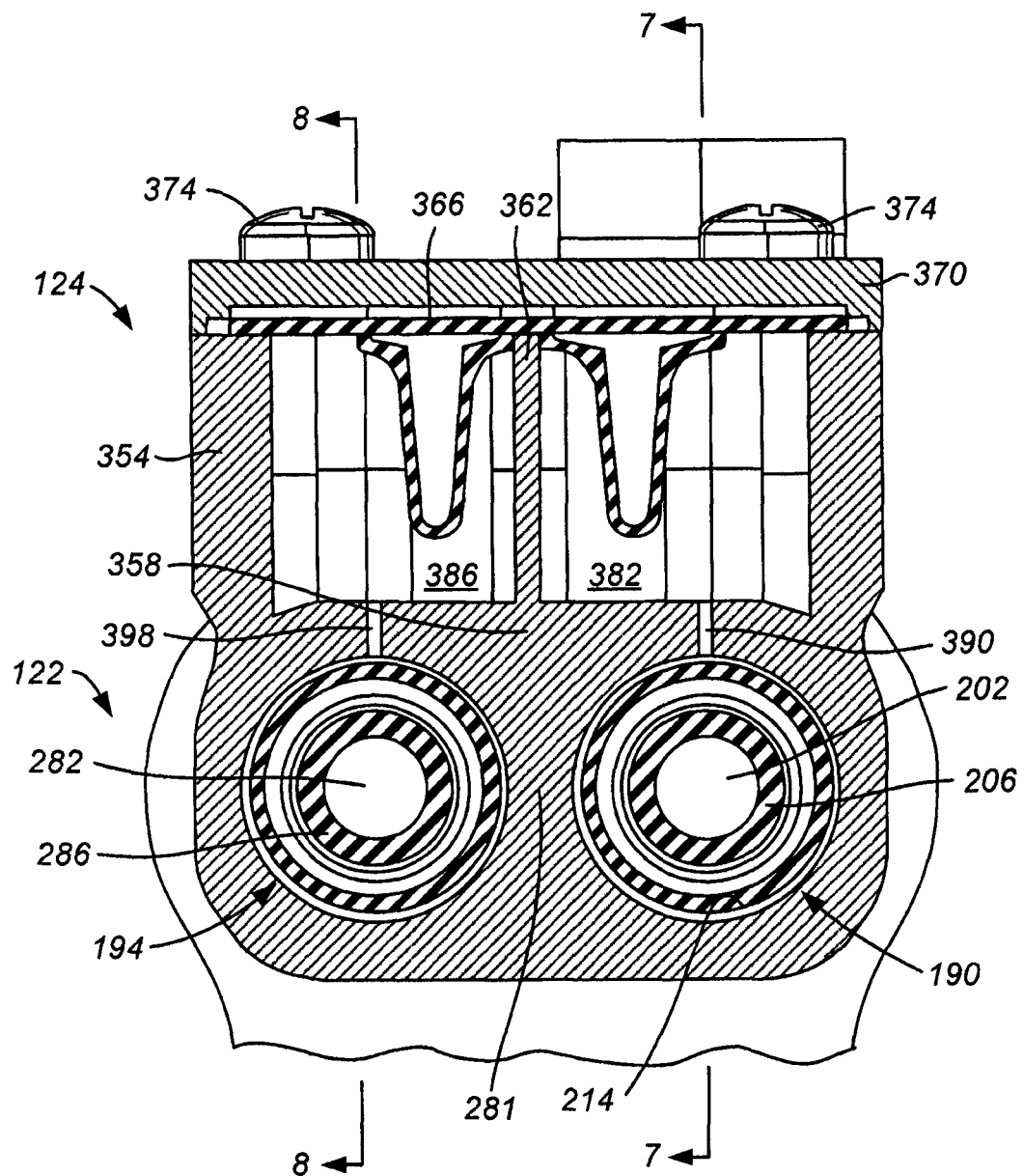
FIG. 6 is a view taken along line 6-6 in FIG. 5.
Figure 7:
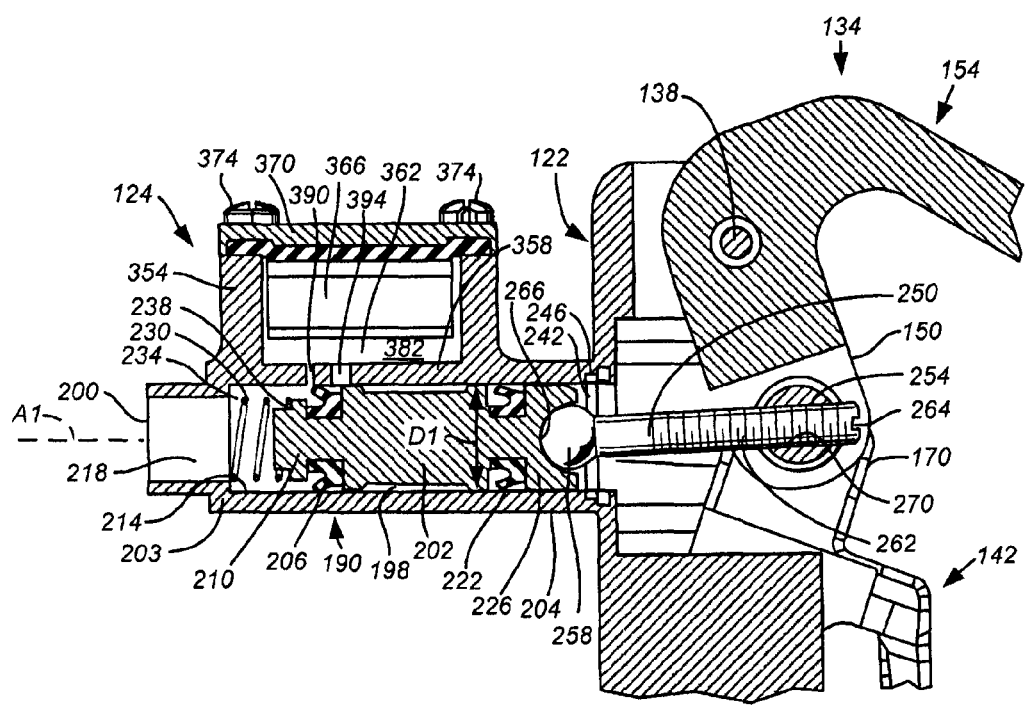
FIG. 7 is a view taken along line 7-7 in FIG. 6.
Figure 8:
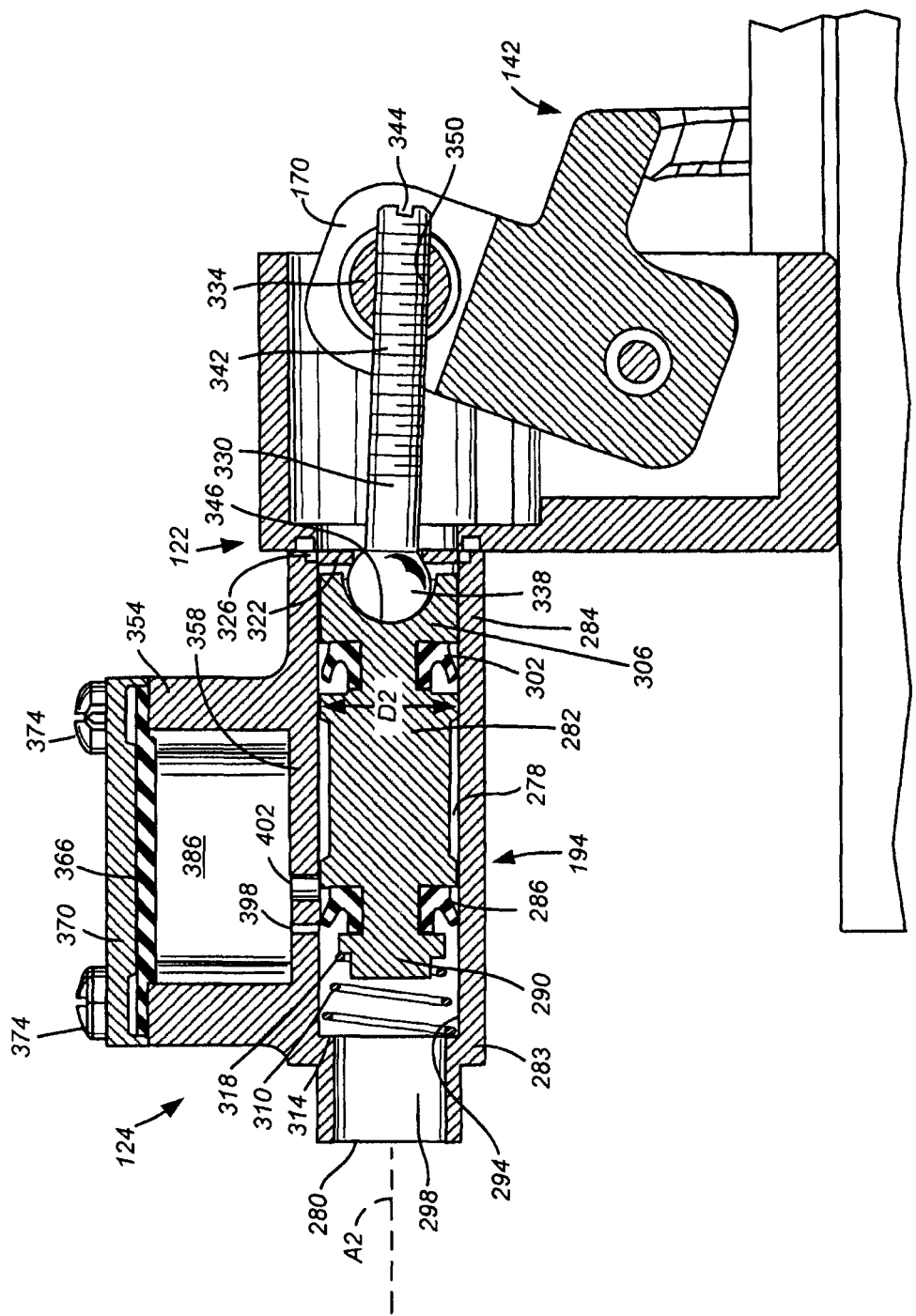
FIG. 8 is a view taken along line 8-8 in FIG. 6.

As shown in FIGS. 6-8, a first master cylinder 190 and a second master cylinder 194 are disposed at housing 122 such that first master cylinder 190 is coupled to second master cylinder 194. As shown more clearly in FIG. 7, first master cylinder 190 includes a first hydraulic chamber 198 and a first fluid outlet 200. A first piston 202 is disposed in first hydraulic chamber 198 for reciprocal movement therein between a first end 203 and a second end 204 of first master cylinder 190 along first axis A1. First hydraulic chamber 198 has a substantially constant diameter D1 along first axis A1. A first cup seal 206 is disposed at a first end 210 of first piston 202 for sealingly engaging an inner surface 214 of first hydraulic chamber 198 so that first piston 202 and first hydraulic chamber 198 form a first pressure chamber 218. A second cup seal 222 is disposed at a second end 226 of first piston 202 for sealingly engaging inner surface 214 of first hydraulic chamber 198. A spring 230 is disposed between an abutment 234 at first end 203 of first master cylinder 190 and an abutment 238 on first end 210 of first piston 202 for biasing first piston 202 towards second end 204 of first master cylinder 190. A retaining ring 242 is fitted within an annular groove 246 in housing 122 for limiting the movement of first piston 202 to the right in FIG. 7.

First lever 134 is coupled to first piston 202 through a first push rod 250 and a first cylindrical bushing 254. First push rod 250 includes a ball head 258, a threaded shank 262, and a tool-engaging slot 264. Ball head 258 fits within a ball socket 266 formed in second end 226 of first piston 202, and threaded shank 262 screws into a threaded bore 270 in first bushing 254. First bushing 254 is rotatably fitted within piston coupling fork 150. As a result, the position of first piston 202 along first axis A1 and/or the rotational position of first lever 134 relative to housing 122 may be adjusted by rotating push rod 250 with a tool such as a screwdriver inserted into tool-engaging slot 264.

As shown more clearly in FIG. 8, second master cylinder 194 includes a second hydraulic chamber 278 and a second fluid outlet 280, wherein second hydraulic chamber 278 shares a common wall 281 (FIG. 6) with first hydraulic chamber 198. In fact, in this embodiment, housing 122 is a continuous one-piece structure that forms both first hydraulic chamber 198 and second hydraulic chamber 278. A second piston 282 is disposed in second hydraulic chamber 278 for reciprocal movement therein between a first end 283 and a second end 284 of second master cylinder 194 along second axis A2. Second hydraulic chamber 278 has a substantially constant diameter D2 along second axis A2. A first cup seal 286 is disposed at a first end 290 of second piston 282 for sealingly engaging an inner surface 294 of second hydraulic chamber 278 so that second piston 282 and second hydraulic chamber 278 form a second pressure chamber 298. A second cup seal 302 is disposed at a second end 306 of second piston 282 for sealingly engaging inner surface 294 of second hydraulic chamber 278. A spring 310 is disposed between an abutment 314 at first end 283 of second master cylinder 194 and an abutment 318 on first end 290 of second piston 282 for biasing second piston 282 towards second end 284 of second master cylinder 194. A retaining ring 322 is fitted within an annular groove 326 in housing 122 for limiting the movement of second piston 282 to the right in FIG. 8.

Second lever 142 is coupled to second piston 282 through a second push rod 330 and a second cylindrical bushing 334. Second push rod 330 includes a ball head 338, a threaded shank 342, and a tool-engaging slot 344. Ball head 338 fits within a ball socket 346 formed in second end 306 of second piston 282, and threaded shank 342 screws into a threaded bore 350 in second bushing 334. Second bushing 334 is rotatably fitted within piston coupling fork 170. As a result, the position of second piston 282 along second axis A2 and/or the rotational position of second lever 142 relative to housing 122 may be adjusted by rotating second push rod 330 with a tool such as a screwdriver inserted into tool-engaging slot 344.

In this embodiment, reservoir unit 124 comprises a square side wall 354 formed by a portion of housing 122 that extends generally perpendicular to first and second axes A1 and A2, a bottom floor 358 that also forms upper wall portions of first master cylinder 190 and second master cylinder 194, a centrally-disposed partition wall 362, an elastomeric diaphragm 366, and a square cover 370. Cover 370 is fixed to the top of side wall 354 by screws 374. Partition wall 362 separates the interior volume of reservoir unit 124 into a first hydraulic fluid reservoir 382 and a second hydraulic fluid reservoir 386. A first vent (inlet) port 390 and a first replenishing port 394 are formed in bottom floor 358 for communicating hydraulic fluid between first hydraulic fluid reservoir 382 and first hydraulic chamber 198, and second vent (inlet) port 398 and a second replenishing port 402 are formed in bottom floor 358 for communicating hydraulic fluid between second hydraulic fluid reservoir 386 and second hydraulic chamber 278. Since partition wall 362 isolates first hydraulic fluid reservoir 382 from second hydraulic fluid reservoir 386, first hydraulic fluid reservoir 382 communicates hydraulic fluid to first vent port 390 and first replenishing port 394 but not to second vent port 398 or second replenishing port 402. Similarly, second hydraulic fluid reservoir 386 communicates hydraulic fluid to second vent port 398 and second replenishing port 402 but not to first vent port 390 or first replenishing port 394.

When first piston 202 and second piston 282 are in the non-operating positions shown in FIGS. 7 and 8, first cup seal 206 on first piston 202 is disposed between first vent port 390 and first replenishing port 394, and first cup seal 286 on second piston 282 is disposed between second vent port 398 and second replenishing port 402. Thus, when first lever 134 moves first piston 202 to the left in FIG. 7, first cup seal 206 on first piston 202 moves past first vent port 390 to pressurize first pressure chamber 218 in a conventional manner, and first cup seal 286 on second piston 282 moves past second vent port 398 to pressurize second pressure chamber 298 in a conventional manner.

Figure 9:
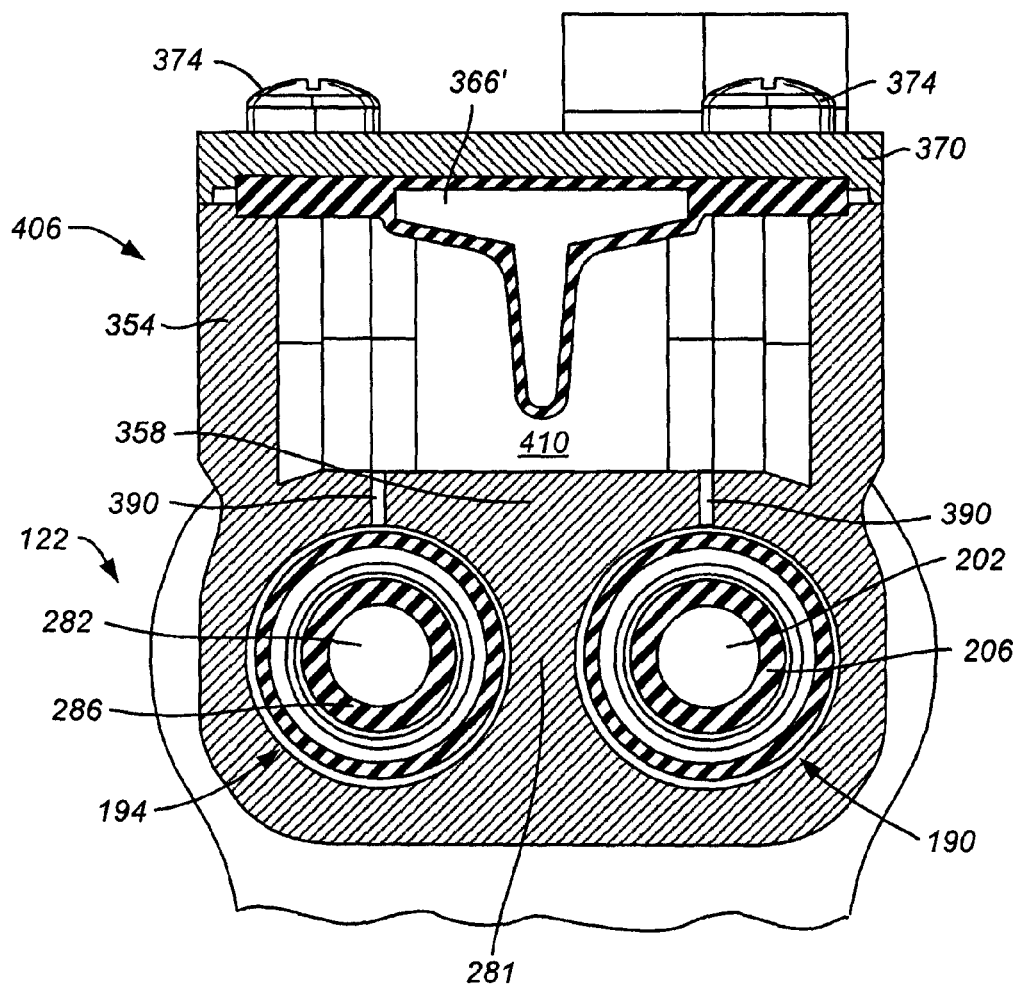
FIG. 9 is a view similar to FIG. 6 showing an alternative embodiment of a hydraulic fluid reservoir.

FIG. 9 is a view similar to FIG. 6 showing an alternative embodiment of a hydraulic fluid reservoir unit 406. This embodiment differs from the first embodiment in that partition wall 362 in the first embodiment has been omitted, and diaphragm 366 in the first embodiment has been replaced by a diaphragm 366'. As a result, a single hydraulic fluid reservoir 410 communicates hydraulic fluid to first vent port 390 and first replenishing port 394 in first master cylinder 190 and to second vent port 398 and second replenishing port 402 in second master cylinder 194.

Figure 10:
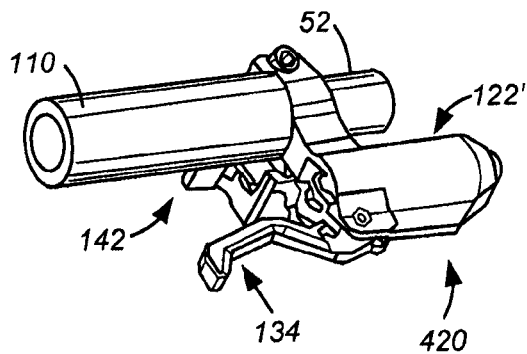
FIG. 10 is a perspective front view of another embodiment of a dual hydraulic controller for bicycle components.
Figure 11:
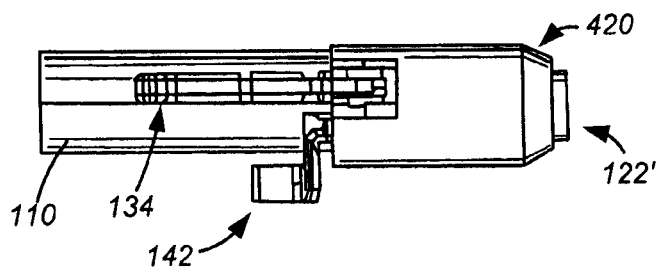
FIG. 11 is a front view of the controller.
Figure 12:
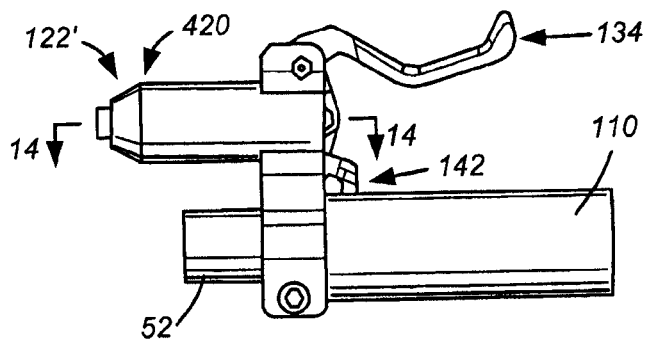
FIG. 12 is a top view of the controller.
Figure 13:
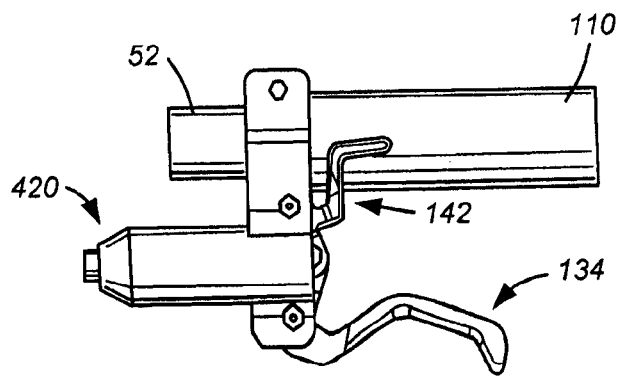
FIG. 13 is a bottom view of the controller.
Figure 14:
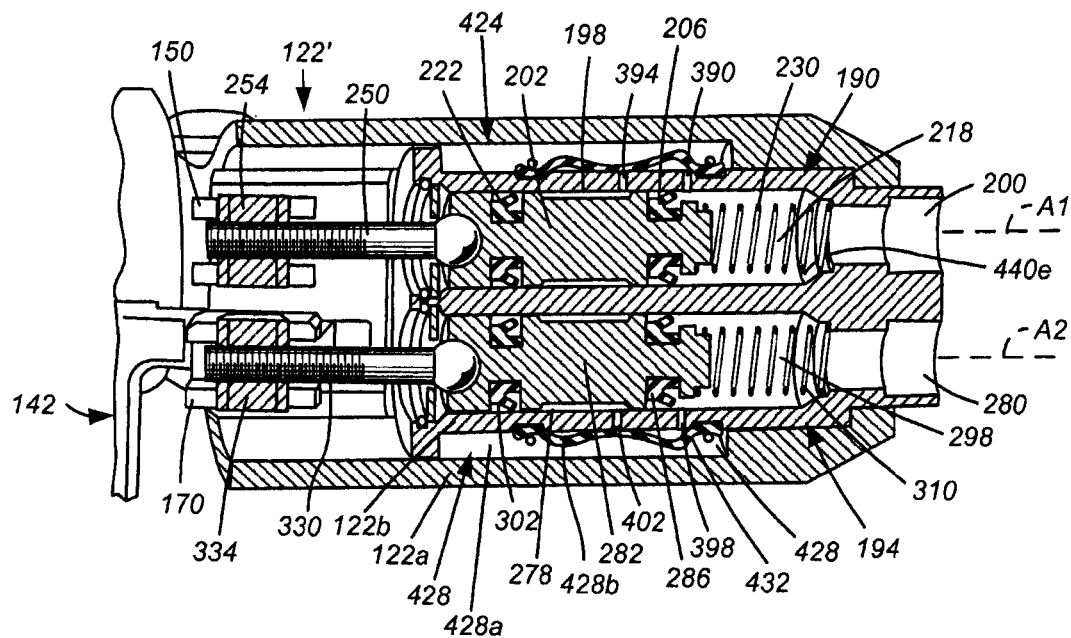
FIG. 14 is a view taken along line 14-14 in FIG. 12.

FIG. 10 is a perspective front view of another embodiment of a dual hydraulic controller 420 for bicycle components. FIG. 11 is a front view of controller 420, FIG. 12 is a top view of controller, FIG. 13 is a bottom view of controller 420, and FIG. 14 is a view taken along line 14-14 in FIG. 12. Components that are the same as in the first embodiment are numbered the same.

In this embodiment, housing 122 has been replaced by a housing 122' without a protruding reservoir unit. Instead, housing 122' forms a single, annular hydraulic fluid reservoir unit 424. More specifically, an outer peripheral wall 122*a* and an inner peripheral wall 122*b* of housing 122' forms an annular space 428 therebetween. An annular reservoir sealing sleeve 432 formed of an elastomeric material is sealingly fitted around inner peripheral wall 122*b* to separate annular space 428 into an annular air space 428*a* and an annular hydraulic fluid space 428*b*. Hydraulic fluid space 428*b* surrounds first hydraulic chamber 218 and second hydraulic chamber 278 and forms a single hydraulic fluid reservoir that communicates hydraulic fluid to first vent port 390 and first replenishing port 394 in first master cylinder 190 and to second vent port 398 and second replenishing port 402 in second master cylinder 194. Hydraulic fluid space 428*b* may be filled with hydraulic fluid using a backflow technique through first fluid outlet 200 or second fluid outlet 280 with the corresponding first piston 202 or second piston 282 in a non-operating position.

Figure 15:
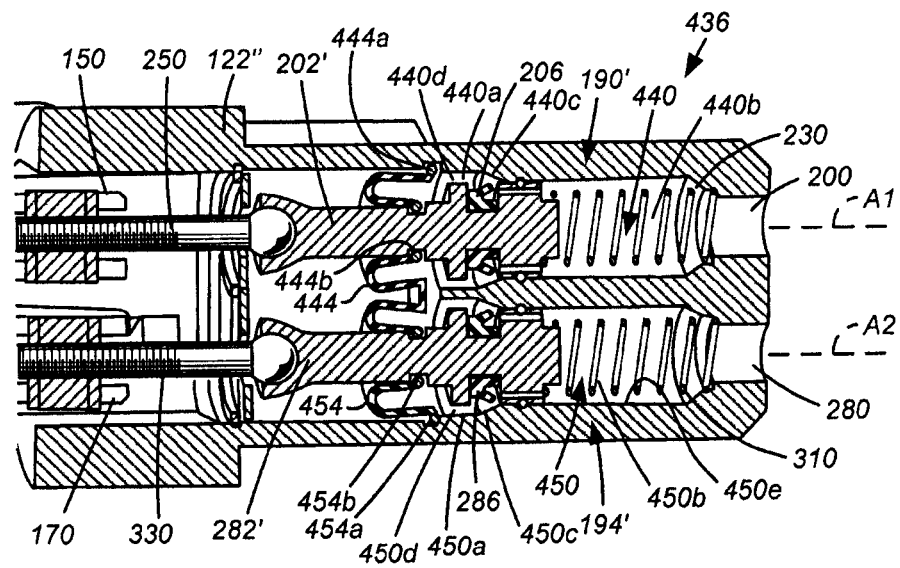
FIG. 15 is a view similar to FIG. 14 of another embodiment of a dual hydraulic controller.

FIG. 15 is a view similar to FIG. 14 of another embodiment of a dual hydraulic controller 436. In this embodiment, a modified housing 122' forms a modified first master cylinder 190' and a modified second master cylinder 194'. First master cylinder 190' includes a first hydraulic chamber 440 that communicates with first fluid outlet 200. First hydraulic chamber 440 includes a larger diameter portion 440*a* and a smaller diameter portion 440*b* separated by a transition wall 440*c* formed by housing 122". A modified first piston 202' omits second seal cup 222 from the first embodiment. Instead, an elastomeric rear chamber seal 444 has an outer peripheral edge 444*a* and an inner peripheral edge 444*b*, wherein outer peripheral edge 444*a* is sealingly fitted to an inner surface 440*d* of larger diameter portion 440*a* of first hydraulic chamber 440, and inner peripheral edge 444*b* is sealingly fitted around first piston 202'. When first piston 202' moves to the right, first cup seal 206 contacts transition wall 440*c* and then sealingly slides along an inner surface 440*e* of smaller diameter portion 440*b* of first hydraulic chamber 440, thereby pressurizing the resulting first pressure chamber formed by first piston 202' and smaller diameter portion 440*b*.

Similarly, second master cylinder 194' includes a second hydraulic chamber 450 that communicates with second fluid outlet 280. Second hydraulic chamber 450 includes a larger diameter portion 450*a* and a smaller diameter portion 450*b* separated by a transition wall 450*c* formed by housing 122". A modified second piston 282' omits second seal cup 302 from the first embodiment. Instead, an elastomeric rear chamber seal 454 has an outer peripheral edge 454*a* and an inner peripheral edge 454*b*, wherein outer peripheral edge 454*a* is sealingly fitted to an inner surface 450*d* of larger diameter portion 450*a* of second hydraulic chamber 450, and inner peripheral edge 454*b* is sealingly fitted around second piston 282'. When second piston 282' moves to the right, first cup seal 286 contacts transition wall 450*c* and then sealingly slides along an inner surface 450*e* of smaller diameter portion 450*b* of second hydraulic chamber 450, thereby pressurizing the resulting second pressure chamber formed by second piston 282' and smaller diameter portion 450*b*.

Figure 16:
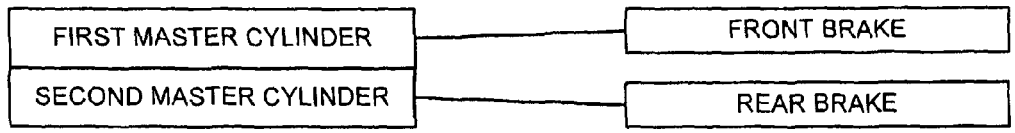
FIGS. 16-22 are schematic views of alternative operating configurations for the dual hydraulic controller.
Figure 17:
Figure 18:
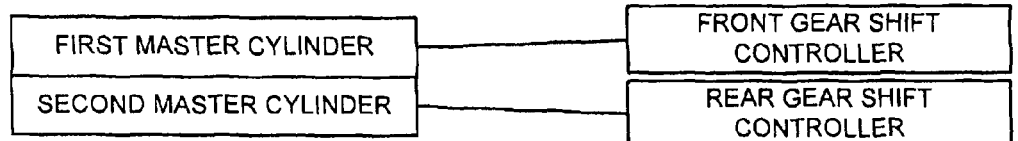
Figure 19:
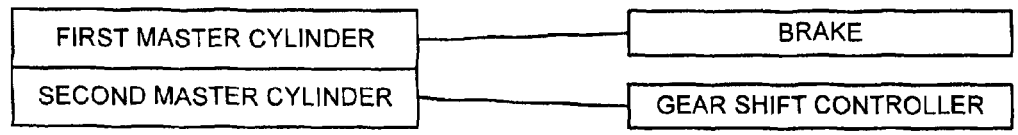
Figure 20:
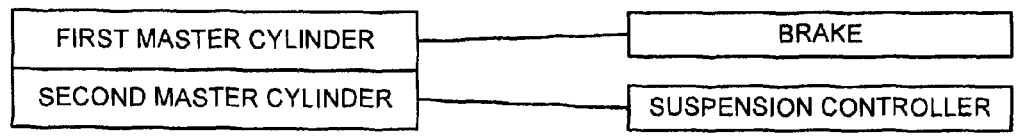
Figure 21:
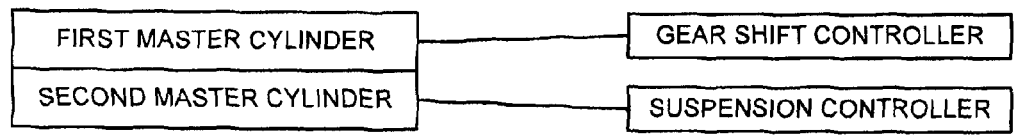
Figure 22:
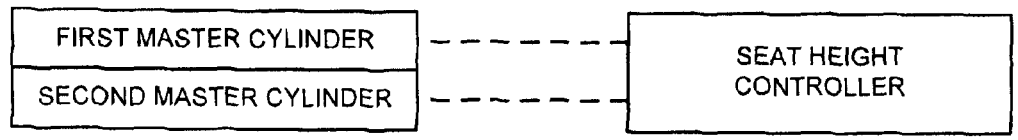

While the above is a description of various embodiments of inventive features, further modifications may be employed without departing from the spirit and scope of the present invention. For example, while levers 134 and 142 were used to control a single derailleur, as schematically shown in FIG. 16, one lever could be used to operate front brake 62, and the other lever (with or without a change in shape of one or more of the levers) could be used to operate rear brake 66. As schematically shown in FIG. 17, one lever could be used to operate a front suspension controller, and the other lever could be used to control a rear suspension controller. As schematically shown in FIG. 18, one lever could be used to operate a front gear shift controller, and the other lever could be used to control a rear gear shift controller. As schematically shown in FIG. 19, one lever could be used to operate a brake, and the other lever could be used to control a gear shift controller. As schematically shown in FIG. 20, one lever could be used to operate a brake, and the other lever could be used to control a suspension controller. As schematically shown in FIG. 21, one lever could be used to operate a gear shift controller, and the other lever could be used to control a suspension controller. As schematically shown in FIG. 22, one or the other lever could be used to operate a seat height controller, wherein the other lever could be used to operate one of the other components.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A dual hydraulic controller apparatus comprising:
   a housing;
   a first master cylinder disposed at the housing, wherein the first master cylinder includes:
   a first hydraulic chamber;
   a first fluid inlet for communicating hydraulic fluid into the first hydraulic chamber;
   a first fluid outlet displaced from the first fluid inlet for communicating hydraulic fluid out from the first hydraulic chamber; and
   a first piston disposed in the first hydraulic chamber for reciprocal movement therein;
   a first operating member coupled to the first piston for reciprocating the first piston;
   a second master cylinder disposed at the housing and coupled to the first master cylinder, wherein the second master cylinder includes:
   a second hydraulic chamber;
   a second fluid inlet for communicating hydraulic fluid into the second hydraulic chamber;
   a second fluid outlet displaced from the second fluid inlet for communicating hydraulic fluid out from the second hydraulic chamber; and
   a second piston disposed in the second hydraulic chamber for reciprocal movement therein;
   a second operating member coupled to the second piston for reciprocating the second piston; and a single reservoir for communicating hydraulic fluid both to the first fluid inlet and to the second fluid inlet, wherein the single reservoir surrounds the first hydraulic chamber and the second hydraulic chamber.

2. The apparatus according to claim 1 further comprising a clamping member for attaching to a handlebar.

3. The apparatus according to claim 1 wherein a same wall forms at least part of both the first master cylinder and the second master cylinder.

4. The apparatus according to claim 3 wherein the same wall forms at least part of both the first hydraulic chamber and the second hydraulic chamber.

5. The apparatus according to claim 1 wherein the first operating member is pivotably coupled to the housing.

6. The apparatus according to claim 5 wherein the first piston reciprocates along a first axis, and wherein the first operating member includes a contact portion having a contact surface adapted to be contacted by a user's hand to operate the first operating member.

7. The apparatus according to claim 6 wherein the first operating member further comprises a movement resisting portion extending from the contact portion and having a contact surface inclined relative to the contact surface of the contact portion for resisting movement of the user's hand in a direction of the first axis.

8. The apparatus according to claim 6 wherein the first operating member includes a free end portion structured to allow the user's hand to move freely off of the contact surface of the contact portion in a direction of the first axis.

9. The apparatus according to claim 5 wherein the second operating member is pivotably coupled to the housing.

10. The apparatus according to claim 9 wherein the first piston reciprocates along a first axis, and wherein the first operating member includes a contact portion having a contact surface adapted to be contacted by a user's hand to operate the first operating member.

11. The apparatus according to claim 10 wherein the first operating member further comprises a movement resisting portion extending from the contact portion and having a contact surface inclined relative to the contact surface of the contact portion for resisting movement of the user's hand in a direction of the first axis.

12. The apparatus according to claim 10 wherein the first operating member includes a free end portion structured to allow the user's hand to move freely off of the contact surface of the contact portion in a direction of the first axis.

* * * * *